United States Patent [19]
McCracken et al.

[11] Patent Number: 5,029,143

[45] Date of Patent: Jul. 2, 1991

[54] SHAFT RUB SIMULATOR

[75] Inventors: Howard B. McCracken, Poway; Robert S. Acks, San Diego; Stanley J. Watson, San Diego, all of Calif.

[73] Assignee: The United States of America as represented by the Secretary of the Navy, Washington, D.C.

[21] Appl. No.: 654,307

[22] Filed: Feb. 2, 1976

[51] Int. Cl.[5] .......... H04B 1/06

[52] U.S. Cl. .......... 367/001; 367/135

[58] Field of Search .......... 35/10.4; 340/384 E, 340/5 D; 367/1, 137; 434/6

[56] References Cited

U.S. PATENT DOCUMENTS

| | | | |
|---|---|---|---|
| 2,898,587 | 8/1959 | Nye | 367/1 |
| 3,092,684 | 6/1963 | Frankel | 367/137 |
| 3,115,535 | 12/1963 | Pastoriza et al. | 434/2 |
| 3,165,734 | 1/1965 | Grodzinsky et al. | 367/1 |
| 3,165,735 | 1/1965 | Aylett | 342/184 |
| 3,311,868 | 3/1967 | Cupp et al. | 367/1 |
| 3,341,697 | 9/1967 | Kaufman et al. | 434/7 |
| 3,795,873 | 3/1974 | Fein | 340/384 E |

*Primary Examiner*—Daniel T. Pihulic

*Attorney, Agent, or Firm*—Harvey Fendelman; Thomas G. Keough

[57] ABSTRACT

A synthesizer for complex acoustic signatures includes a generator for an electrical analog of a complex acoustic waveform corresponding the the "shaft rub" noise produced by the interaction of a marine propeller shaft and a stern tube or other through-the-hull marine fitting. This circuitry employs digital random generators to produce a nonrecurring characteristic signal synthesizing this acoustic noise. An arrangement to process this signal with other simulation circuitry is also disclosed.

16 Claims, 3 Drawing Sheets

40
50
30
41
42
43
44
46
47
48
49
51
52
53
54
55
56
57
31
32
33
OS-2002
OS-2001
+15VDC
-15VDC
C.V.
SINE-WAVE
SWEPT FREQUENCY
AMPLITUDE MODULATION
FUNDAMENTAL OF HARMONIC FREQUENCY GENERATOR
(TO FIG. 3B.)
RAMP GENERATOR FOR SWEEP CONTROL

SHAFT RUB SIMULATOR

STATEMENT OF GOVERNMENT INTEREST

The invention described herein may be manufactured and used by or for the Government of the United States of America for governmental purposes without the payment of any royalties thereon or therfor.

DESCRIPTION OF THE PRIOR ART

A variety of methods are known in the prior art to electrically simulate complex audio waves. In one method,tape recordings are taken from the operational environment by using conventional underwater recording equipment and these acoustic signatures are replayed when desired. Unfortunately, it is a very expensive, time consuming, and somewhat unsatisfactory method of generating acoustic signatures in a practical environment. This difficulty arises because of the size and the amount of processing time required for a complete library of acoustic signatures which would provide a useful simulation capability. This difficulty arises because of the great number of ships for which acoustic signatures are required, the variety of such ships, and the nearly infinite variety of operational circumstances in which such recordings must be made.

As an example, the acoustic signature made by a propeller shaft having normal operational contact with a stern tube or other marine fitting generates a chirp-like sound which varies according to ship speed, loading, and other nonyclic conditions. Thus, a recording of a ship's acoustic signature which includes this shaft-rub signal if replayed continuously would emit a monotonous or cyclic reoccurrance of the signal which, in fact, does not occur in operational conditions.

Although attempts have been made to electronically synthesize complex acoustic signals no solution to the problem of including a shaft-rub signature is known to exist in the prior art.

FIELD OF THE INVENTION

This invention pertains to the field of electroacoustics. More particularly, this invention pertains to the field of acoustic signal generation. In still greater particularity, this invention pertains to the generation of complex, nonrecurring, acoustic signals. In still greater particularity, but without limitation thereto, this invention pertains to the generation of complex, acoustic ship signatures including a "shaft-rub" component.

SUMMARY OF THE INVENTION

The chirp-like aural characteristics which simulate shaft-rub are generated by controlled amplitude and frequency modulation of a sine wave carrier. A controlled modulation of this sine wave signal is provided such that the acoustic tone and its recurrence characteristics may be accurately produced to simulate a real life condition. This simulation is produced by the mixing and control of six basic electronic circuits, including a beginning frequency randomizer, a frequency sweep control, a swept sine wave oscillator, a shaft related signal generator, a chirp amplitude randomizer generator, and an RPM dependent scale factor circuit. The outputs of these individual circuits are used to control the outputs of other circuits and are mixed in suitable multipliers to produce the desired complex acoustic wave.

It is, accordingly, an object of this invention to provide an improved electro-acoustic generator.

A further object of this invention is to provide an electro-acoustic generator for synthesizing a complex audio wave form.

Another object of this invention is to provide a method and electronic circuit to accurately synthesize complex acoustic components of acoustic signatures of a marine vessel.

A still further object of this invention is to provide a synthesizer for the acoustic signature of a marine vessel which includes a component corresponding to the acoustic output of a rubbing propeller shaft.

Yet another object of this invention is to provide a method and electronic circuit to accurately synthesize complex acoustic wave forms having randomly reoccurring components.

A still further object of this invention is to provide a synthesizer for acoustic signatures using a digital random address circuit to sample a memory and produce randomly arranged portions of acoustic signatures.

These and other objects of the invention will become more readily apparent from the ensuing specification when taken together with the drawings.

DESCRIPTION OF THE PREFERRED EMBODIMENTS

Figure 1:
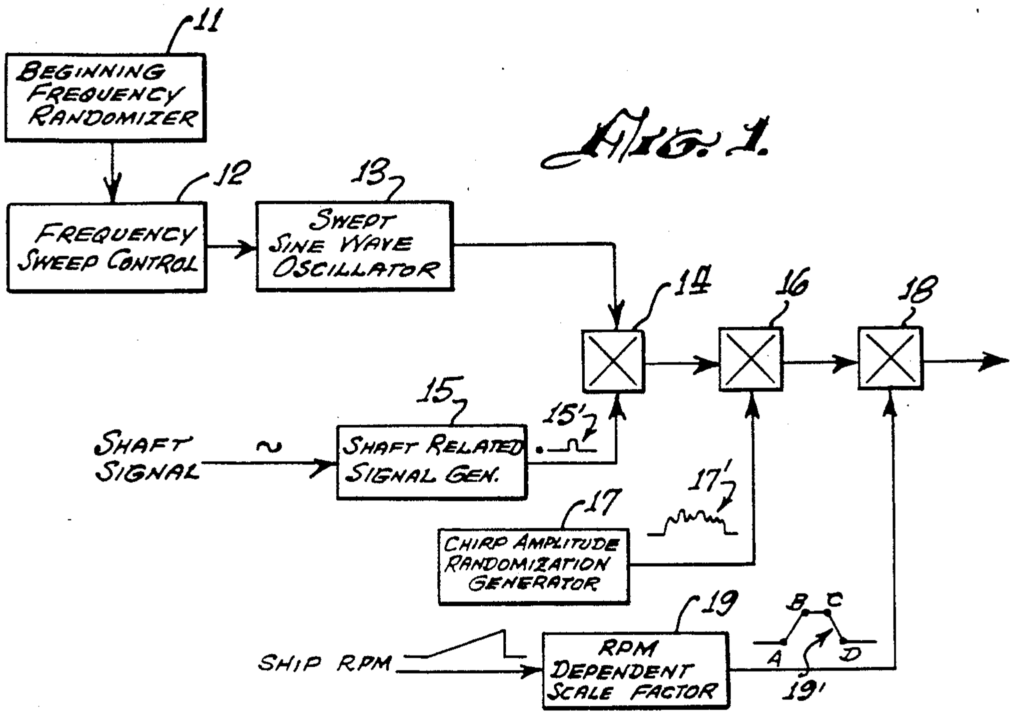
FIG. 1 is a diagrammatic representation of the overall circuit of the invention.

Referring to FIG. 1, a block diagram of the overall system is illustrated. As shown, beginning frequency randomizer 11 controls a frequency sweep control circuit 12. The detailed construction of the frequency randomizer 11 will be described in greater detail with respect to a chirp amplitude randomization generator 17. However as frequency randomizer, the circuit generates a randomization factor ($f_R$) which randomizes the beginning frequency of the sweep. The frequency randomizer circuit 11 operates such that $f_R$ can take on values of 0, 40, 60, 75, 100, 140, 180, 200, and 220 Hz. Each of these values is chosen at random with equal probability of choice and a new value chosen for each occurrence of the chirp.

Frequency sweep control 12 functions to control a swept sine wave oscillator 13 in frequency such that the beginning of its sweep and the termination of its sweep is synchronized with the beginning and end of the random chirp characteristic output of randomizer 11. The beginning sweep frequency of the sine wave oscillator is given by:

$$f_b=f_o-f_R.$$

Where:

$f_b$—the beginning frequency of the sweep $f_o$—the maximum frequency permissible for the beginning of the frequency sweep $f_R$—the beginning frequency randomization factor.

The maximum beginning frequency $f_o$, for the downsweep is a ship dependent parameter. That is, it is dependent upon the particular physical characteristics of the ship which is set to the specific value within the range of 2,000 Hz to 1,000 Hz. Selection within this range is made to best match the acoustic characteristic exhibited by the ship of interest. The output of swept sine wave oscillator 13 is fed to a multiplier 14 where it is mixed with the output of shaft related signal generator 15.

The shaft related signal generator 15 has an output 15' which is related to a portion of a sinusoidal wave. Such a segmentation of the sinusoidal wave is required because, characteristically, shaft rub occurs only over a limited portion of the rotation of the propeller shaft of a marine vessel. Thus, the shaft related signal generator 15 may be considered to generate a portion of a sine wave in response to a sine wave signal which is fed from other associated circuitry and is termed a shaft signal. The shaft signal is processed by shaft related signal generator 15 such that an output is produced over a portion of the cycle of the shaft signal.

Thus, it has been found that for proper operation, the bias for the shaft related signal generator 15 must be set such that the output is zero for angles of $\theta$ less than 78° and corresponds to the sine of 78° minus sine of $\theta$ for angles where data is between 78° and 112° and is again returned to zero for angles where $\theta$ is between 112° and 360°. $\theta$ here refers to the instantaneous value of the sine wave shaft signal expressed as degrees, as is common practice in the electronics arts. This output is used to provide an amplitude scale in mixer 14 to control the output of swept sine wave oscillator 13 in amplitude.

Figure 2:
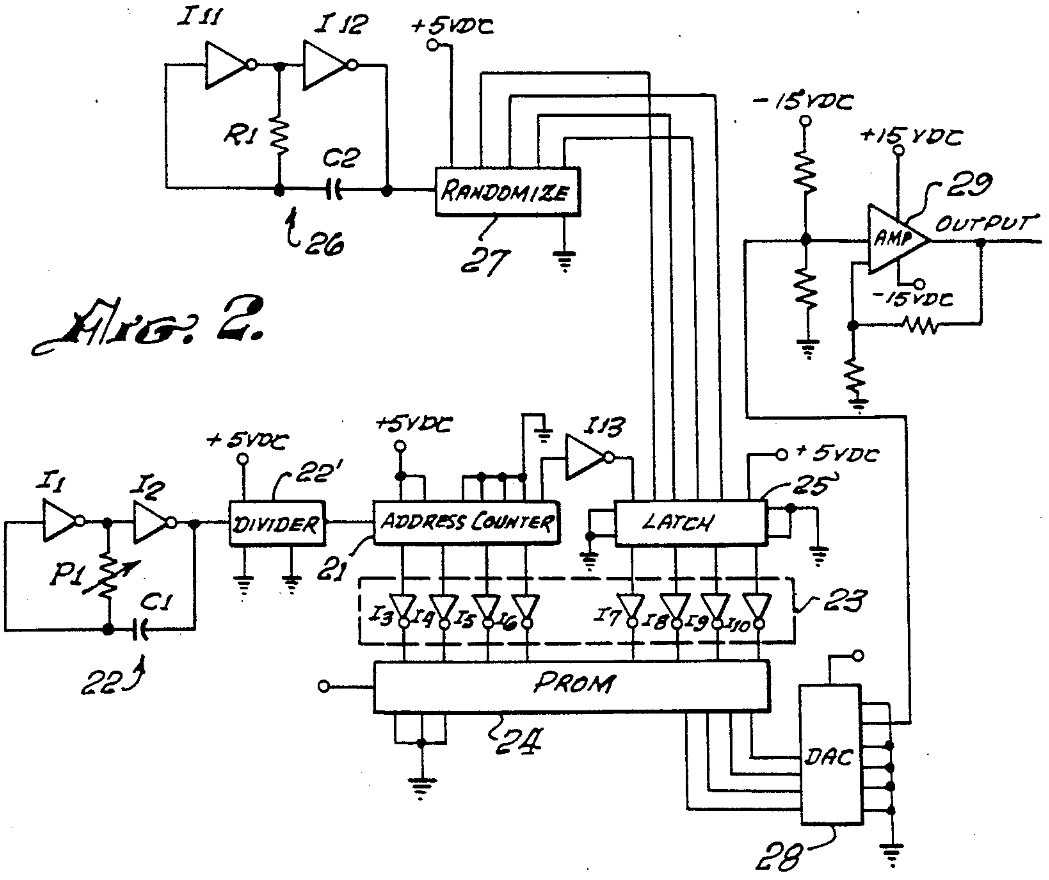
FIG. 2 is a diagrammatic representation of the randomizer circuit employed in FIG. 1.

The output of multiplier 14 is fed to an additional multiplier 16 where it is mixed with the output of a chirp amplitude randomization generator 17. Chirp amplitude randomization generator 17, which is shown in FIG. 2 produces an output which corresponds to the acoustic characteristic of the chirp signal and includes frequency and amplitude data which correspond to the data taken from tapes of typical surface ships for which acoustic signatures are being synthesized. This output is indicated at 17' and includes an acoustic burst of energy having various random frequency and amplitude components.

The output of multiplier 16 is fed to an additional multiplier 18 where it is scaled in accordance with an RPM dependent scale factor which is generated by an RPM dependent scale factor circuit 19. RPM scale factor generator 19 produces a scaling function indicated at 19' which is a control voltage rising from a first reference level to a second reference level during an up-slide portion, indicated at point A to B in waveform 19', and, after a predetermined interval, a down-slide portion, indicated at points C and D of waveform 19'. The up-slide and down-slide points A, B, C, and D of waveform 19' are ship dependent paramenters and are set to best match the characteristics of the ship of interest. The RPM scaling function ramp, when mixed as an amplitude modulating signal in multiplier 18, controls the chirp-like "shaft-rub" signal in such a way as to:

(1) be absent from the acoustic signal below a set RPM level, indicated in a flat portion of output curve 19' before reaching point A;

(2) fade into the acoustic signal as a function of RPM during the increase ramp between point A and B of waveform 19';

(3) appear in the acoustic signal over a set band of RPM as determined by the portion of waveform 19' between points B and C;

(4) fade out of the acoustic signal as a function of RPM above a set RPM as indicated by the down-slide portion of waveform 19'; and (5) completely disappear from the acoustic signature at a set RPM as indicated by the portion of waveform 19' beyond point D.

Thus, it can be seen that the circuit of FIG. 1 accomplishes the desired injection of a "shaft-rub" signal in a complex waveform with onset points and diminishing points as does the naturally occuring signal and has amplitude variations synchronized with the shaft rotation and, therefore, closely synthesizes the actual signal occurring in surface ship acoustic signatures.

As will be recognized, a signal may be generated from acoustic circuits of conventional configuration and mixed in the various multipliers 14, 16, and 18 in a variety of manners. Further, the individual signals generated by the various circuits, and the circuits required to generate them, may be selected from known audio signal generation circuits in accordance with good design practice in the acoustic and electronic arts.

Since most of the circuits are well understood, it is believed unnecessary to describe in particular detail each and every detail and possible configuration of multiplier and circuit arrangements. However, for purposes of propaedeutic explanation and completeness, exemplary circuit arrangements which have proven satisfactory in developmental models of the invention will be described.

Referring to FIG. 2, the basic type of randomizer circuit which is used in the practice of the invention is illustrated. As described, the circuit will be considered to be that illustrated at 17 in FIG. 1, to provide the chirp-like amplitude arrangement randomization signal 17'. A similar circuit is provided for beginning frequency randomizer 11 to produce the randomization factor $f_R$ as desired. An astable multivibrator 22 includes two inverters I1 and I2 together with potentiometer P1 and capacitor C1 connected as shown. This astable multivibrator is used as an address driving clock for the generator and its output is chosen to provide the correct driving signal for address counter 21. When, as in the case illustrated, a relatively low frequency is desired to be used as a driving clock, the digital output is fed to a divider 22' to provide the necessary signal division to achieve the desired frequency. In the instant example, divider 22' is an integrated circuit sold under the trade designation "CD4004" and is connected to be a divide by 128 counter such that the addressing signal for address counter 21 is that fraction of the output of astable multivibrator 22. This signal division prevents the large values which would be required for potentiometer P1 and capacitor C1 if direct drive were employed.

Address counter 21 (a CD4029, 4-bit, binary counter) counts the divided clock pulses from the divider counter 22°. As address counter 21 counts, its output states are fed to an oct-inverter 23 where they are used to generate addresses for a 256-word by 4-bit-per-word programmed read-only memory (PROM). The PROM (a HPROM 1-1024) is used as a look-up table to generate stored binary signal patterns as the address counter counts through its address states. The carry-out output of address counter 21 is fed via inverter I13 to be used as a preset command to latch circuit 25. Latch circuit 25 is a 5-bit binary counter (CD4018) which is operated as a 4-bit latch, and, on command from the carry out signal via inverter I13, latches the randomization signals.

Inverters I11 and I12, together with resistor R1 and capacitor C2 form a fixed frequency, astable multivibrator which serves as a randomization driving clock. The clock pulses from this clock are counted by the randomization counter 27 and serve as inputs to the randomization latch 25.

The outputs from PROM 24 are connected to the four most significant input bits of an 8-bit, digital-to-analog converter 28, the least significant four bits of which have been connected to ground. The analog converted output of this PROM digital signal is fed to interface circuitry, such as amplifier 29, to produce the desired output signal.

Thus, the operation of the circuit may be seen to retrieve from PROM 24 previously stored frequency components of the shaft rub signals and connect them in a random manner such that a composite signal, such as indicated at 17′, include randomly joined signal bits.

In the sequence of operation, the circuit randomly selects one of the stored PROM segments. The circuit then goes to the first address of that segment and cycles through that segment from its first address to its last address. Upon reaching the last address of the segment, the circuit repeats the process by again randomly selecting one of the stored PROM segments.

By following these steps segments are randomly connected, end-to-end in time, to generate a long-term, semirandom, controlled sequence, which appears to the casual listener to be nonrepeating. As will be well understood, care must be taken to ensure that the segment ends match well enough that they fit together smoothly to form the long-term pattern. Naturally, caution in selecting the various segments must be exercised such that no segment contains a unique characteristic which would make even random repetition obvious. Further, care should be taken that, when the analog waveforms desired are generated, the converter output is adequately filtered to exhibit no step-like structure.

It should be noted that modern integrated circuit components permit the randomization generator to be incorporated on a conventional plug-in circuit board and occupies such a small space that two such generators for example, for circuits 11 and 17 may be included on a single circuit board together with their interface circuitry and a randomization driver.

Figure 3A:
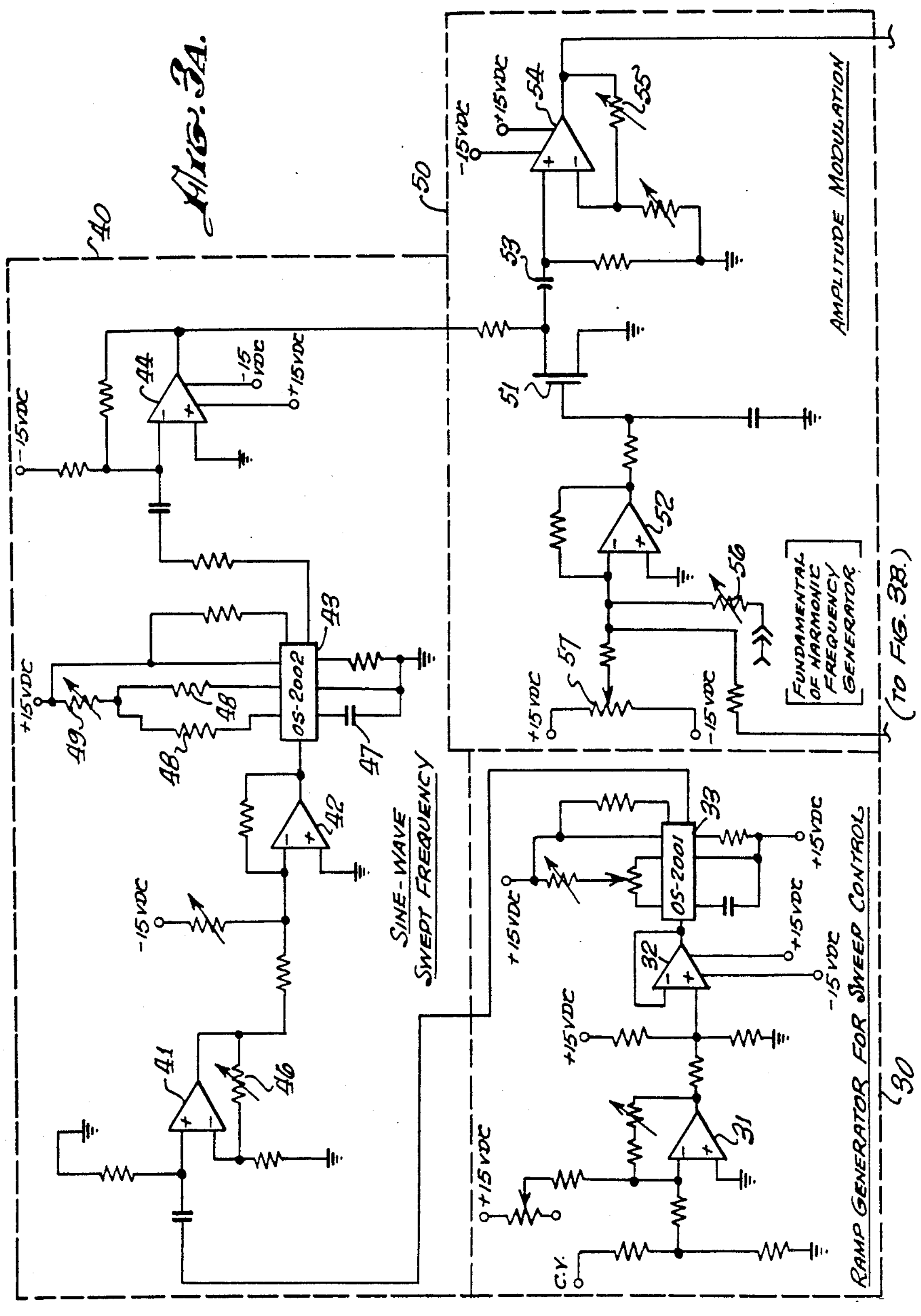
FIGS. 3*a* and 3*b* are, together, a schematic representation of an implementation of remaining portions of the circuit illustrated in FIG. 1.

Referring to FIG. 3*a*, ramp generator for sweep control circuit 30 generates a frequency sweep command signal for the sine wave generator circuitry, to be described. Circuit 30 corresponds to frequency sweep control 12 illustrated in FIG. 1 and receives a control voltage, C.V. in FIG. 3*a*, from a randomizing circuit similar to chirp amplitude randomization generator 17 as described in FIG. 2 with the PROM serving as a look-up table containing stored starting RPM values corresponding to 0, 40, 60, 75, 100, 140, 180, 200, and 220 Hz.

A control amplifier 31 provides the adjustment of values required to convert the control voltage applied thereto to the proper range to operate the voltage controlled oscillator 33. Similarly, control amplifier 32 provides a buffered separation between voltage control oscillator 33 and operational amplifier 31. Voltage control oscillator 33 is a conventional available voltage control oscillator and, in developmental models, that marketed under the trade designation INTERSIL ICL 8038 has proven satisfactory.

Thus, the output of oscillator 33 is connected to a sine wave swept frequency generator circuit 40 and it causes the output of the circuit to slide up and down in frequency at a slide rate which is harmonically related to the fundamental frequency of a harmonic frequency generator having a sinusoidal output corresponding to the shaft speed and the first eleven harmonics thereof. Thus, operational amplifier 31 may be adjusted by the gain and output level controls illustrated to establish the frequency sweep rate for the sine wave generator frequency which will remain harmonically related to the shaft rate.

Sine wave swept frequency generator 40 includes an operation amplifier 41 as a component of its conditioning circuitry to control the amplitude of ramp generator output which controls the width of the sweep when fed to sine wave generator 43. This signal processing is required since the output from the ramp generator circuit 30 is a fixed amplitude dual slope ramp. If this output were used directly as a frequency slide control to the voltage controlled oscillator 43, a fixed bandwidth frequency slide would result. This fixed frequency slide would not prove adequate since an adjustable bandwidth frequency slide is required for realistic simulation of a wide variety of surface ships.

Control amplifier 41 is provided with associated control circuitry including a potentiometer 46 which controls the gain of this amplifier. The amplifier 41 may be any commercially available semiconductor device, however, for purposes of completeness it should be noted that the one marketed under the trade designation "5558 " has proven satisfactory in developmental models of the invention. The output of this control amplifier is fed to a second control amplifier 42, of the same type, which provides signal matching and drive for voltage control oscillator 43.

Voltage control oscillator 43 may be the same type voltage control oscillator used for voltage control oscillator 33. The center frequency of oscillator 43 is determined by two independent controls. The primary center frequency of the oscillator is determined by the RC time constant established by capacitor 47 and resistors 48 together with potentiometer 49. The use of potentiometer 49 permits the adjusting of the center frequency of voltage control oscillator 43 to a desired value. The secondary center frequency control is determined by the dc voltage component of the voltage applied to its control input.

The output of voltage control oscillator 43 is capacitively coupled to amplifier 44 where it is amplified before being introduced to the amplitude modulation circuitry illustrated at 50.

Amplitude modulation circuit 50 includes a field effect transistor 51 which performs the amplitude modulation of a sine wave generator circuit 40 under the control of the modulating signal generated as the output of amplifier 52.

When transistor 51 is turned on, the output of the sine wave generator circuit 40 is shorted to ground and its signal is greatly attenuated at capacitor 53. As transistor 51 is turned off, the output signal available at capacitor 53 increases, and is amplitude modulated by the control voltage for transistor 51 and appears as an amplitude modulated output of the sine wave swept frequency generator 40.

The fundamental of a harmonic frequency generator is fed to amplifier 52 by potentiometer 56 and provides the basis of the modulation. This fundamental harmonic frequency generator output relies on a dc bias set by potentiometer 57 and the output of the RPM dependent scale factor circuitry to be described in connection with FIG. 3*b*.

The output of the bias control is adjusted such that when the output of the RPM dependent scale factor circuitry is at a logic zero, the modulating signal at the gate of transistor 51 does not cross the turn-off threshold of the transistor. As a result, the transistor is held on and no occurrence of the shaft rub simulation is generated. When the output of the RPM dependent scale factor circuitry is at a logic one, as determined by the RPM signal the gate of transistor 51 is biased so that the tips of the shifted sine wave cross the turn off threshold of transistor 51. During the time that the turn off threshold of transistor 51 is exceeded (negatively), the amplitude modulated output of the sine wave generator circuitry is present at capacitor 53.

The output of transistor 51 is ac coupled by capacitor 53 before being amplitude scaled by a variable gain amplifier 54. Potentiometer 55 adjusts the gain of amplifier 54 and, therefore, controls the amplitude of the amplitude modulation and scaling circuit output. The amplitude modulated waveform appearing as the output of amplifier 54 is coupled to the amplitude modulation scaling circuitry of FIG. 3*b*.

Figure 3B:
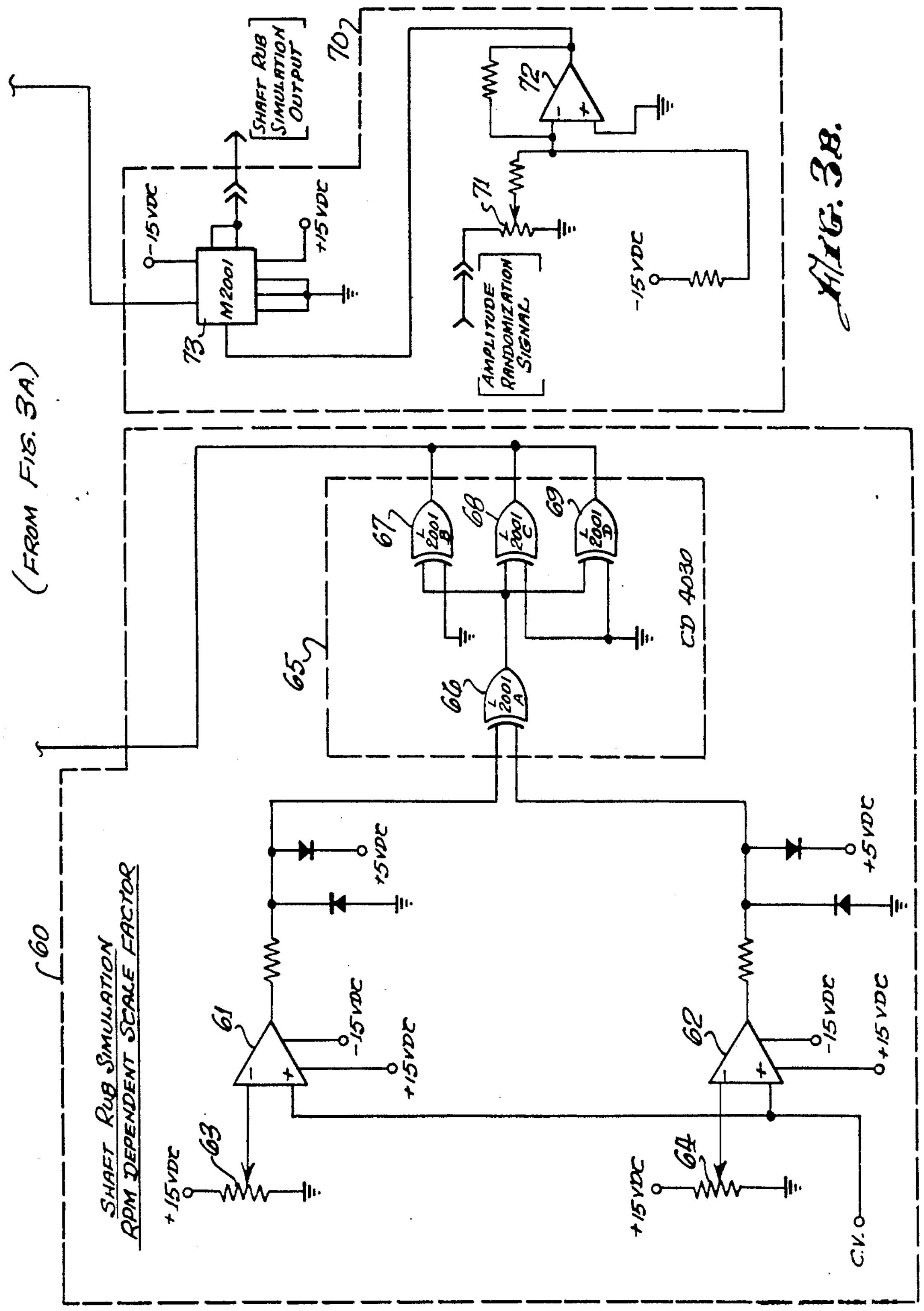

Referring to FIG. 3*b*, it may be seen that this figure is a continuation of the circuitry of FIG. 3*a* and will be discussed in two parts.

The first part is the shaft-rub simulation RPM dependent scale factor circuit 60. The purpose of the RPM dependent scale factor circuitry 60 is to generate an RPM dependent scale factor which causes the shaft-rub simulation characteristic to appear in the signature over a controllable range of ship's RPM. Amplifiers 61 and 62 serve as a variable threshold, voltage comparator. One input of each of these amplifiers is the programmer control voltage which, as previously discussed, signifies the ship's RPM which is being simulated. Potentiometer 63 sets the comparison level for amplifier 61 and, similarly, potentiometer 64 determines the comparison level for amplifier 62. Potentiometer 64 is used to set the lower RPM start/stop point and potentiometer 63 is used to set the upper RPM start/stop point.

When the programmer control voltage exceeds the comparison level set for amplifier 62 set by potentiometer 64, a logic "1" is available at the input of the "exclusive or" logic gate 66. Logic gate 66 is a portion of a four unit CMOS gate 65. If the threshold is not exceeded, a logic "0" is available at this input. Likewise, if the programmer control voltage exceeds the comparison level set for amplifier 61, logic "1" is available at the other control input of "exclusive or" gate 66; and if threshold is not exceeded, a logic "0" is available. The output of "exclusive or" logic gate 66, which is logic "1" when the two inputs are different logic states and logic "0" when they are of the same state, is fed to logic gates 67, 68, and 69 which are connected in parallel and serve as a buffer to provide additional drive. This additional drive is beneficial since, as previously noted, the circuit 65 is composed of CMOS gates which have limited drive capability.

As noted in connection with the description of FIG. 3*a*, the output of this signal is fed to control amplifier 52 where it provides a portion of the dc bias previously described. Thus, the output of the amplitude modulation and scaling circuitry is an equal-amplitude, repetitious-occurring "shaft-rub" simulation. Each time the modulating wave form exceeds the cut off threshold of transistor 51, the shaft-rub simulation is generated.

The repetition and equal amplitude of the characteristic which is generated creates an unrealistic simulation, if left unmodified. Suitable modification is provided by the final multiplier which is illustrated in FIG. 3*b* at 70. As shown, a potentiometer 71 provides an operative connection between the amplitude randomization signal generated by the circuit of FIG. 2 and feeds this signal to control amplifier 72. Control amplifier 72 in turn feeds a signal to a multiplier 73 which is controlled by the output of amplifier 72. Potentiometer 71 is adjusted so that the amplitude randomized shaft-rub simulation realistically varies in amplitude and realistically appears and disappears in the signature dependence upon the aforerecited parameters.

Thus, it may be seen that the output from multiplier 73 is a "shaft-rub" simulation waveform which provides a realistic simulation of this complex audio signal.

The foregoing description, taken together with the appended claims constitutes a disclosure such as to enable a person skilled in the electroacoustic and signal simulation arts and having the benefit of the teachings contained therein to make and use the invention. Further, the structure herein described meets the objects of the invention and generally constitutes a meritorious advance in the art unobvious to such a worker not having the benefit of these teachings.

Obviously, many modifications and variations are possible in the light of the above teachings, and, it is therefore understood the invention may be practiced otherwise than as specifically described.

What is claimed is:

1. A signal generator for developing an electrical analog of complex acoustic energy representative of a shaft-rub component of an acoustic signature of a marine vessel comprising:
   - a swept sine wave oscillator means for producing a varying frequency sine wave electrical signal;
   - a shaft related signal generator means for producing an output signal which follows a continuous trigonometric wave over a portion of its cycle and remains zero during the remainder thereof, the output signal being representative of shaft rub in a through-the-hull fitting;
   - a randomizer circuit means for producing a pseudorandom signal having randomly varying amplitude components;
   - scale factor generator circuit which produces a trapezoidal signal having a predetermined transition point; and
   - multiplier circuit means effectively connected to said swept sine wave oscillator, said shaft related signal generator means, said randomizer circuit means and said scale factor generator to receive the output signals therefrom for combining the output signals into a complex signal 2. A signal generator according to claim 1 in which said swept sine wave generator includes a ramp generator which is triggered by a randomized sweep frequency ramp generator.

3. A signal generator according to claim 1 in which said scale factor generator circuit includes:
   - an exclusive OR circuit having first and second logic inputs;
   - a first operational amplifier connected to the first logic input of said exclusive OR circuit;
   - a first threshold determining means connected to said first operational amplifier for setting a conduction threshold therefor;

a second operational amplifier connected to the second logic input of said exclusive OR circuit;

a second threshold determining means connected to said second operational amplifier for setting a conduction threshold therefor; and input circuit means connecting the inputs of said first and second operational amplifiers to a common signal source, whereby the logic states of said exclusive OR circuit may be controlled by the first and second threshold setting means.

4. A signal generator according to claim 3 wherein said threshold setting means include potentiometers which are set to provide voltage comparison points corresponding to RPM values of a marine vessel propulsion system.

5. A signal generator according to claim 1 wherein said randomizer circuit means includes a programmed read-only memory storing a plurality of digital signal representations of acoustic components.

6. A signal generator according to claim 5 in which said randomizer further includes:

an address clock means effectively connected to said programmed read-only memory to serve as source of signals to advance the programmed read-only memory through the addresses of a selected register;

a latch circuit connected to said programmed read-only memory to provide a register selection therefor and hold said register address until reset to a different register address;

a randomized signal source connected to said latch circuit to continuously supply a plurality of addresses thereto;

transfer gate means effectively connected to said address clock means and connected to said latch means for resetting said latch means upon completion of the last address within the selected register; and digital-to-analog converter means connected to said programmed read-only memory for changing the digital output thereof to an analog signal having pseudo-random characteristics.

7. A signal generator according to claim 1 in which said multiplier circuit means includes a plurality of individual multiplier circuits.

8. A signal generator according to claim 7 in which said plurality of individual multipliers number three.

9. A signal generator circuit according to claim 8 in which said three multiplier circuits include:

a first multiplier circuit means effectively connected to the aforesaid swept sine wave oscillator and to the aforesaid shaft related signal generator means so as to receive the outputs thereof for producing a compound signal therefrom;

a second multiplier circuit means effectively connected to said first multiplier means to receive the compound signal and connected to the aforesaid randomizer circuit means to receive the pseudo-random output signal therefrom for producing a second compound signal therefrom; and a third multiplier circuit means effectively connected to said second multiplex circuit means to receive the second compound output signal therefrom and to the aforesaid scale factor generator circuit to receive the output thereof for producing a third compound signal therefrom.

10. A signal generator according to claim 9 in which the aforesaid scale factor generator circuit includes:

an exclusive OR circuit having first and second logic inputs;

a first operational amplifier connected to the first logic input of said exclusive OR circuit;

a first threshold determining means connected to said first operational amplifier for setting a condition threshold therefor;

a second operational amplifier connected to the second logic input of said exclusive OR circuit;

a second threshold determining means connected to said second operational amplifier for setting a conductor threshold therefor; and input circuit means connecting the inputs of said first and second operational amplifiers to a common signal source, whereby the logic status of said exclusive OR circuit may be controlled by the first and second threshold setting means.

11. A signal generator according to claim 10 wherein said threshold setting means includes potentiometers which are set to provide voltage comparison points corresponding to RPM values of a marine vessel propulsion system.

12. A signal generator according to claim 11 wherein the aforesaid randomizer circuit means includes a programmed read-only memory storing a plurality of digital signal representation of acoustic components.

13. A signal generator according to claim 12 in which said randomizer further includes:

an address clock means effectively connected to said programmed read-only memory to serve as source of signals to advance the programmed read-only memory through the addresses of a selected register;

a latch circuit connected to said programmed read-only memory to provide a register selection therefor and hold said register address until reset to a different register address;

a randomized signal source connected to said latch circuit to continuously supply a plurality of addresses thereto;

transfer gate means effectively connected to said address clock means and connected to said latch means for resetting said latch means upon completion of the last address within the selected register; and digital-to-analog converter means connected to said programmed read-only memory for chaning the digital output thereof to an analog signal having pseudo-random characteristics.

14. A signal generator according to claim 13 in which the aforesaid multiplier circuit means includes a plurality of individual multiplier circuits.

15. A signal generator according to claim 14 in which said plurality of individual multipliers number three.

16. A signal generator circuit according to claim 15 in which said three multiplier circuits include:

a first multiplier circuit means effectively connected to the aforesaid swept sine wave oscillator and to the aforesaid shaft related signal generator means so as to receive the outputs thereof for producing a compound signal therefrom;

a second multiplier circuit means effectively connected to said first multiplier means to receive the compound signal and connected to the aforesaid randomizer circuit means to receive the pseudo-random output signal therefrom for producing a second compound signal therefrom; and a third multiplier circuit means effectively connected to said second multiplex circuit means to receive the second compound output signal therefrom and to the aforesaid scale factor generator circuit to receive the output thereof for producing a third compound signal therefrom.

* * * * *